United States Patent [19]

Alsenz

[11] Patent Number: 5,191,643
[45] Date of Patent: Mar. 2, 1993

[54] METHOD AND APPARATUS FOR REFRIGERATION CONTROL AND DISPLAY

[76] Inventor: Richard H. Alsenz, 2402 Creekmeadows, Missouri City, Tex. 77459

[21] Appl. No.: 537,155

[22] Filed: Jun. 12, 1990

Related U.S. Application Data

[63] Continuation of Ser. No. 356,634, May 29, 1989, abandoned, which is a continuation of Ser. No. 848,164, Apr. 4, 1986, abandoned.

[51] Int. Cl.⁵ ............................................. G09G 1/06
[52] U.S. Cl. ................................... 395/155; 395/161; 395/164
[58] Field of Search ................ 364/518, 521, 477; 312/116; 237/2 A, 2 R; 236/92 B, 91 R, 94; 395/155, 161, 164

[56] References Cited

U.S. PATENT DOCUMENTS

| | | | |
|---|---|---|---|
| 4,152,902 | 5/1979 | Lush | 62/157 |
| 4,435,787 | 3/1984 | Yasuoka | 365/190 X |
| 4,439,997 | 4/1984 | Cantley | 62/175 |
| 4,540,295 | 9/1985 | Okunishi et al. | 219/216 PH |
| 4,602,251 | 7/1986 | Sawada et al. | 340/799 X |
| 4,613,852 | 9/1986 | Maruko | 340/799 X |
| 4,649,401 | 3/1987 | Kojima et al. | 364/519 X |
| 4,710,762 | 12/1987 | Yamada et al. | 340/799 X |

FOREIGN PATENT DOCUMENTS 0073486  8/1982  European Pat. Off. ............ 365/230

OTHER PUBLICATIONS

Honeywell Brochure for Product W7505A, dated Jan. 1986, pp. 1-31.

Primary Examiner—Heather R. Herndon

[57] ABSTRACT

A control and display apparatus and method for use with a heating and cooling system. Operating parameters of the system are arranged in a computer memory in a data structure comprising a plurality of virtual spreadsheets, the cells of which are individually displayed on an alphanumeric display panel. A keypad comprising at least four keys is provided to move the field of the display panel to a cell to be displayed and for adjusting system operating parameters within the cell.

20 Claims, 8 Drawing Sheets

PROGRAM FLOW CHART

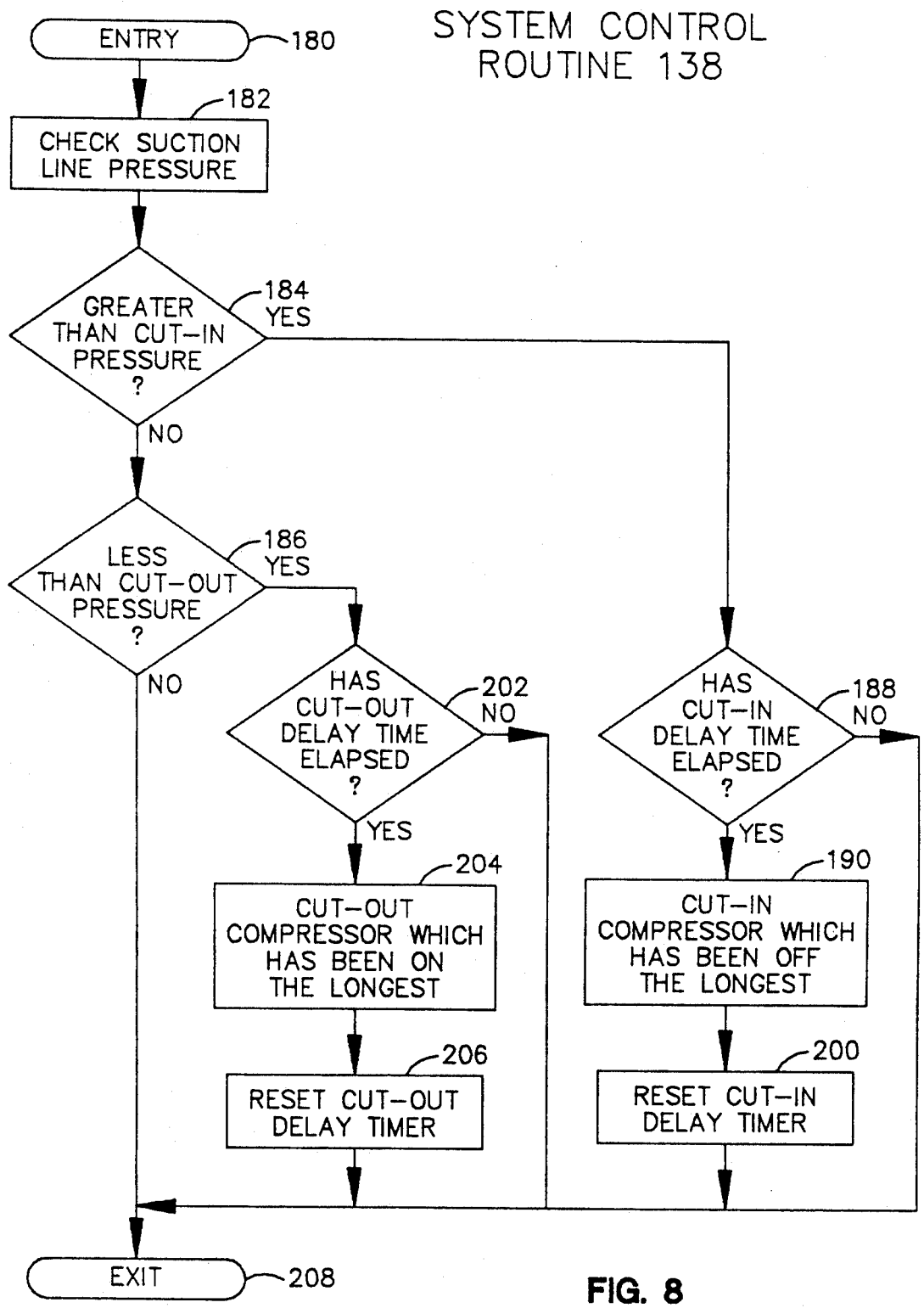

METHOD AND APPARATUS FOR REFRIGERATION CONTROL AND DISPLAY

This is a continuation of Ser. No. 356,634, filed May 22, 1989, which is a continuation of Ser. No. 848,164, filed Apr. 4, 1986 both abandoned.

BACKGROUND OF THE INVENTION

1. Field of the Invention

This invention relates to an apparatus and method for the storage and displaying of operating parameters of a refrigeration system, and for controlling such system in response to the stored parameters. More particularly, the present invention relates to a method and apparatus for arranging the operating parameters of a refrigeration system within the cells of a plurality of data arrays whereby individual data arrays cells may be displayed and adjustments made to parameters stored therein.

2. Background Art

A large refrigeration system, such as that required for commercial refrigerators or air conditioners, will generally have a large number of system operating parameters which must be adjusted and/or observed. Such a system will comprise several air conditioning compressors, expansion coils and condensing coils. Various temperature controlled areas within the system will have individual thermostats for controlling the temperature in their respective areas.

Operating parameters within the system may be categorized as either adjustable parameters or measurable parameters. Measurable parameters may, for example, comprise temperatures in various areas, compressor suction line pressure, and compressor operating time. Adjustable parameters may, for example, comprise compressor suction line cut-in and cut-out pressures, defrost cycle times, maximum and minimum levels of humidity within the building, and the like.

Control and display systems commonly used for refrigeration systems generally comprise a large control panel with a large number of gauges for reading measurable parameters, as well as control knobs, alphanumeric key pads and thumbwheel switches for setting the values of adjustable parameters. Control and display panels commonly used in the art frequently require a great deal of space, thus limiting the number of locations within a building where the control and display panel may be installed. Such control panels are also very difficult for the user to understand and to operate, and accordingly, require highly trained personnel when adjustments to system settings are required. These prior art control panels suffer the added disadvantage that changes in the control system are not readily made, and often require modifications to the control panels to accommodate additional control functions.

It would be advantageous, therefore, to provide a small, compact control and display panel implemented with advanced display technology and microcomputers which could be installed at any convenient point within the building. Additionally, the flexibility of a control and display system driven by a programmable microcomputer would permit a single type of control and display system to be readily adapted to almost any refrigeration system. As refrigeration units are added to the system, simple changes in the stored program would permit the same control and display panel to be used without physical or structural modifications.

Typically, only a small number of the operating parameters of the refrigeration system must be displayed simultaneously to the system operator. Alphanumeric display systems, such as liquid crystal display panels, provide a suitable means for displaying a limited amount of information. Under the control of a stored program microcomputer, a liquid crystal display provides sufficient flexibility so as to adequately display and label a small number of the system's operating parameters.

It is a general object of the present invention, therefore, to provide an inexpensive and compact yet powerful and adaptable control and display unit requiring only a small number of operator actuated input devices and a single alphanumeric display for controlling a refrigeration system to permit display and adjustment of operating parameters within the system.

SUMMARY OF THE INVENTION

In accordance with the present invention, a control system having a display unit for displaying and adjusting system operating parameters is disclosed. The control system comprises a memory for storing a plurality of system operating parameters arranged conceptually within cells of a plurality of data arrays. The display unit includes a moving window display means for selectively displaying values of system parameters, and for displaying a selector adjustable to allow vectoring of the moving window display to display cells in the other data arrays. The control system additionally comprises an input control means for selecting one or more cells for display, and for adjusting parameters and selectors held and displayed within the cell.

In one embodiment of the present invention, a stored program microcomputer is employed to receive operator input from the control means, update values of selectors and parameters contained within the memory responsive to the operator input, and transmit parameter values to be displayed by the moving window display.

According to a more particular aspect of the present invention, an input/output system is employed for receiving measured values of parameters within the refrigeration system and transmitting adjusted values of parameters to the heating and cooling system. In this aspect of the invention, the input/output unit comprises analog/digital conversion means for converting measured parameter values in analog form into digital form for storage within the memory. The input/output unit further comprises means for transmitting and receiving discrete data.

BRIEF DESCRIPTION OF THE DRAWINGS

The present invention is better understood by reading a description of a preferred embodiment of the invention taken in conjunction with the following drawings, in which:

FIG. 8 shows a more detailed diagram of the System Control routine shown in the flow diagram of FIG. 6.

Similar reference numerals refer to similar elements throughout the several views of the invention.

DETAILED DESCRIPTION OF THE PREFERRED EMBODIMENT

Figure 1:
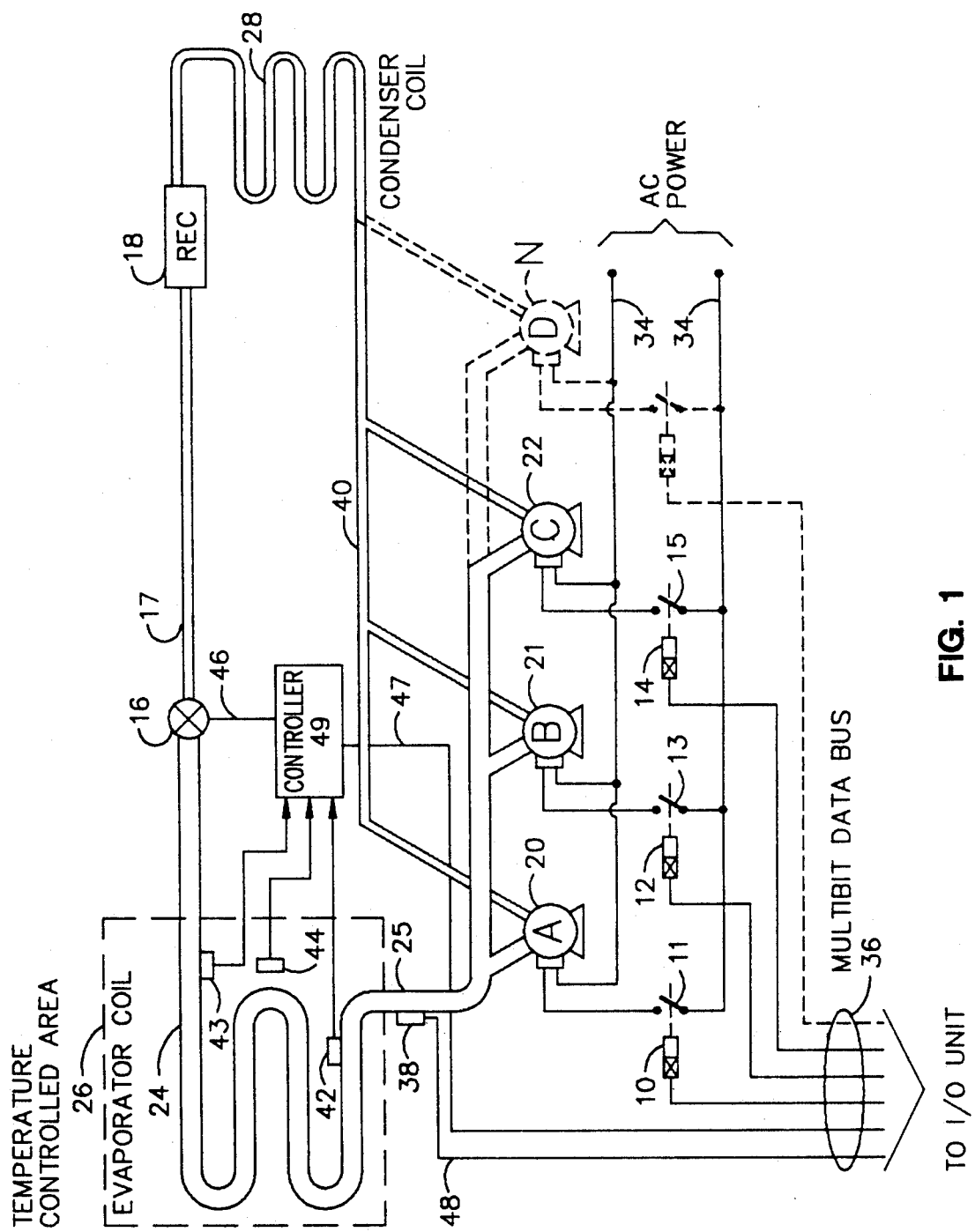
FIG. 1 shows a portion of a refrigeration system controlled by the present invention.

A plurality of data values may be conveniently arranged for display in data arrays, much like a spreadsheet, comprising a plurality of cells arranged in a rectangular matrix. The present invention creates a virtual spreadsheet from a plurality of data arrays where each data array is comprised of cells of related data stored in a computer memory. The various cells within the data arrays in the memory are linked together to form the virtual spreadsheet. The cells may contain adjustable parameters, measurable parameters, selectors, and labels in appropriate combinations to provide groups of meaningful data which may be displayed to an operator.

A moving window display is provided in accordance with the present invention whereby the operator may select for viewing one or more of the cells. A control means is provided for adjusting the values of adjustable parameters which may be contained in the displayed cell. Additionally, in a manner later to be described, the control means provides a way of adjusting selectors whereby the operator may vector the moving window display within the virtual memory from one data array to another.

Within the present invention, parameters are categorized as either adjustable or measurable. One example of a measurable parameter is the temperature measured by a temperature sensor within a temperature controlled area serviced by the refrigeration system. Another example of a measurable parameter is the suction line pressure measured at the inlet to a compressor. These parameters may be thought of as adjustable in the sense that the system may attempt to maintain their values within specified limits for proper refrigeration system operation. However, these parameters are not directly adjusted by an operator, but rather, they typically respond to adjustments made during system control, such as the "cutting in" of additional compressors to increase system compressor capacity.

By contrast, adjustable parameters comprise parameters which an operator may directly control, for example, compressor suction line pressure control range limits, and the cut-in and cut-out pressures. The operator may directly adjust the values of cut-in and cut-out pressure so that when the measured suction line pressure reaches one of these values, system compressor capacity may be changed as appropriate. Adjustable parameters are in the nature of operating limits set by the operator while measurable parameters are measured values used within the system indicating the system's response to control.

A special example of adjustable parameters is configuration information pertaining to the particular equipment within the refrigeration system being controlled. One example of such configuration information is the number of compressors used by the refrigeration system (see, for example, FIG. 3, first cell, row 56). Another example of such configuration information is a table of all the electrically actuated relay contacts within the refrigeration system together with an indication of whether a particular set of contacts is categorized as normally open or normally closed (not shown in FIG. 3).

The present invention maintains a high degree of flexibility and adaptability by storing this configuration information and, in a manner later to be described, permitting change of the configuration information through an easy to understand and operate control panel. The present invention can thus adapt to configuration changes in the refrigeration system being controlled without the necessity of redesign.

Turning now to the Figures and first to FIG. 1, a multi-compressor refrigeration unit is shown for cooling a temperature controlled area 26. Four compressor units 20, 21, 22 and N (labeled A, B, C and D, respectively) are commonly piped to pump refrigerant through the line 40 into a condenser coil 28. Refrigerant is compressed to a liquid within the condenser coil 28. Liquid refrigerant flows out of the condenser coil 28 into a receiver 18, then through a line 17 to an expansion valve 16. Refrigerant passes through the expansion valve 16 into an evaporator coil 24 where it changes to vapor form and absorbs heat within the temperature controlled area 26. Refrigerant then passes out of the evaporator coil 24 through a suction line 25 and returns to the compressor units 20, 21, 22 and N.

Each of the compressor units 20-N includes an electric motor for rotating the respective compressors. The compressor unit 20 receives power from the AC power bus 34 through the relay contacts 11, which are actuated by the solenoid 10. In a similar fashion, power is supplied to the compressor unit 21 through a pair of contacts 13 actuated by a solenoid 12. The compressor unit 22 receives power through a pair of contacts 15 actuated by a solenoid 14. An additional compressor N is shown in dotted lines indicating that other compressor units may be added as needed to supply the requisite cooling capacity.

An expansion valve controller 49 controls the opening and closing of the expansion valve 16 in response to temperatures measured by a pair of temperature sensors 42 and 43. The temperature sensor 42 senses the temperature of the expansion coil 24 at the outlet end while sensor 43 senses the temperature at the inlet end. The temperature sensor 44 senses the temperature within the area 26 and in certain cases may be used to control the selection process for the compressors 20-N. One example of such a use of the area temperature 44 to control refrigeration system operation is disclosed in my co-pending application Ser. No. 706,403 filed Feb. 27, 1985, now U.S. Pat. No. 4,628,700, which application and U.S. patent are incorporated herein by reference for all purposes.

The controller 49 uses the temperatures from sensors 42 and 43 as a measure of the superheat of the liquid refrigerant in the evaporator coil. An embodiment of a solenoid actuated expansion valve 16 and controller 49 are disclosed in my co-pending application Ser. No. 639,271, filed Aug. 8, 1984, which has now issued as U.S. Pat. No. 4,651,535. Application Ser. No. 639,271 and U.S. Pat. No. 4,651,535 are incorporated herein by reference for all purposes.

As disclosed in application Ser. No. 639,271, the controller 49 sends a signal along a wire 46 which alternately opens and closes the expansion valve 16. The average flow of refrigerant into the evaporator coil 24, hence the amount of cooling within the area 26, is determined by the ratio of the time the expansion valve 16 is open to the time it is closed. When the superheat temperatures sensed by the sensors 42 and 43 is too high, the ratio is increased to allow a greater average flow of refrigerant. Alternatively, when the sensed superheat is too low, the ratio is decreased to reduce the average flow of refrigerant.

The refrigerant pressure within a suction line 25 is sensed by a pressure sensor 38. A signal proportional to the sensed pressure is transmitted to the control unit 1 on the wire 48. The present invention uses this sensed pressure to switch the compressor units 20, 21, 22 and N on and off. One such control stratagem for selecting the energized compressors in response to the suction line pressure, i.e., selecting the system compressor capacity, is disclosed in my co-pending application Ser. No. 257,113, filed Apr. 24, 1981, which has now issued as U.S. Pat. No. 4,612,776. Application Ser. No. 257,113 and U.S. Pat No. 4,612,776 are incorporated herein by reference for all purposes.

The wire 48 from the pressure sensor 38 is combined with the serial databus 47 and the wires supplying power to the solenoids 10, 12, 14 and 19 to form a multi-bit data bus 36 which interconnects components of the refrigeration system to the control unit of the present invention.

Figure 2:
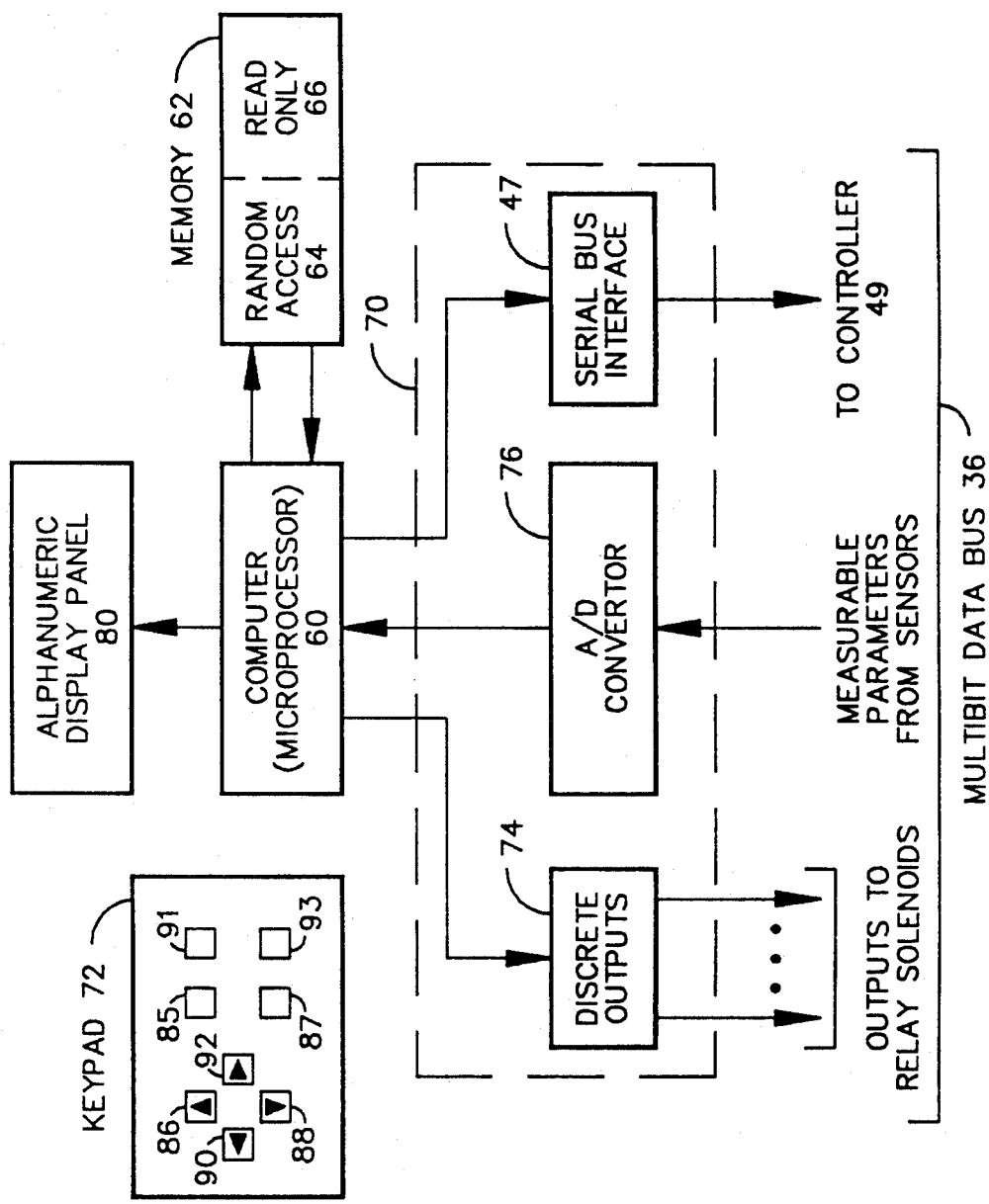
FIG. 2 shows a block diagram representation of the preferred embodiment of the present invention for controlling the system of FIG. 1.

Referring now to FIG. 2, there is shown a simplified functional block diagram of the control unit 1 in accordance with the present invention. Control Unit 1 comprises a digital computer 60 in communication with a computer memory 62. The computer 60 may be any microprocessor of a type commonly available in the electronics industry. The computer memory 62 includes a random access memory portion 64 for the storage of parameters and other data computed by the computer 60 in the course of its operation. The random access memory portion 64 also contains configuration information. The memory 62 is further comprised of a read-only memory portion 66 for storing a stored program for execution by the digital computer 60.

A moving window display unit 80 is provided, and includes an alphanumeric display panel. The display panel 80 is preferably implemented using liquid crystal display technology well known in the electronic art. Operator input is provided to the digital computer 60 by a keypad 72 comprising a plurality of operator actuated input keys, at least four keys dedicated to controlling the selection of data array memory cell contents, and the modification of parameters stored therein. Additional keys may be provided to permit rapid advancement to separate data array memory cells for display and for adjustment of the contents therein.

An input/output (I/O) unit 70 allows the digital computer 60 to communicate with a refrigeration system, such as that shown in FIG. 1. Inputs and outputs from the unit 70 are connected to the multi-bit data bus 36 for communication with the refrigeration system.

The I/O unit 70 includes a set of discrete outputs 74 which supply power to the solenoids 10, 12, 14, and 19 (FIG. 1) to switch compressor units 20, 21, 22 and N, respectively, on and off. Additionally, other discrete outputs may be provided as required for switching within the refrigeration system of FIG. 1. Measurable parameters such as those sensed by the temperature sensors 42, 43 and 44, and the pressure sensor 38 are converted to digital form by an analog to digital (A/D) convertor 76 within the I/O unit 70. A serial databus interface 78 transmits operating parameter values, such as setpoint temperatures to the controller 49 (FIG. 1) via the serial databus 47 interface.

Figure 3:
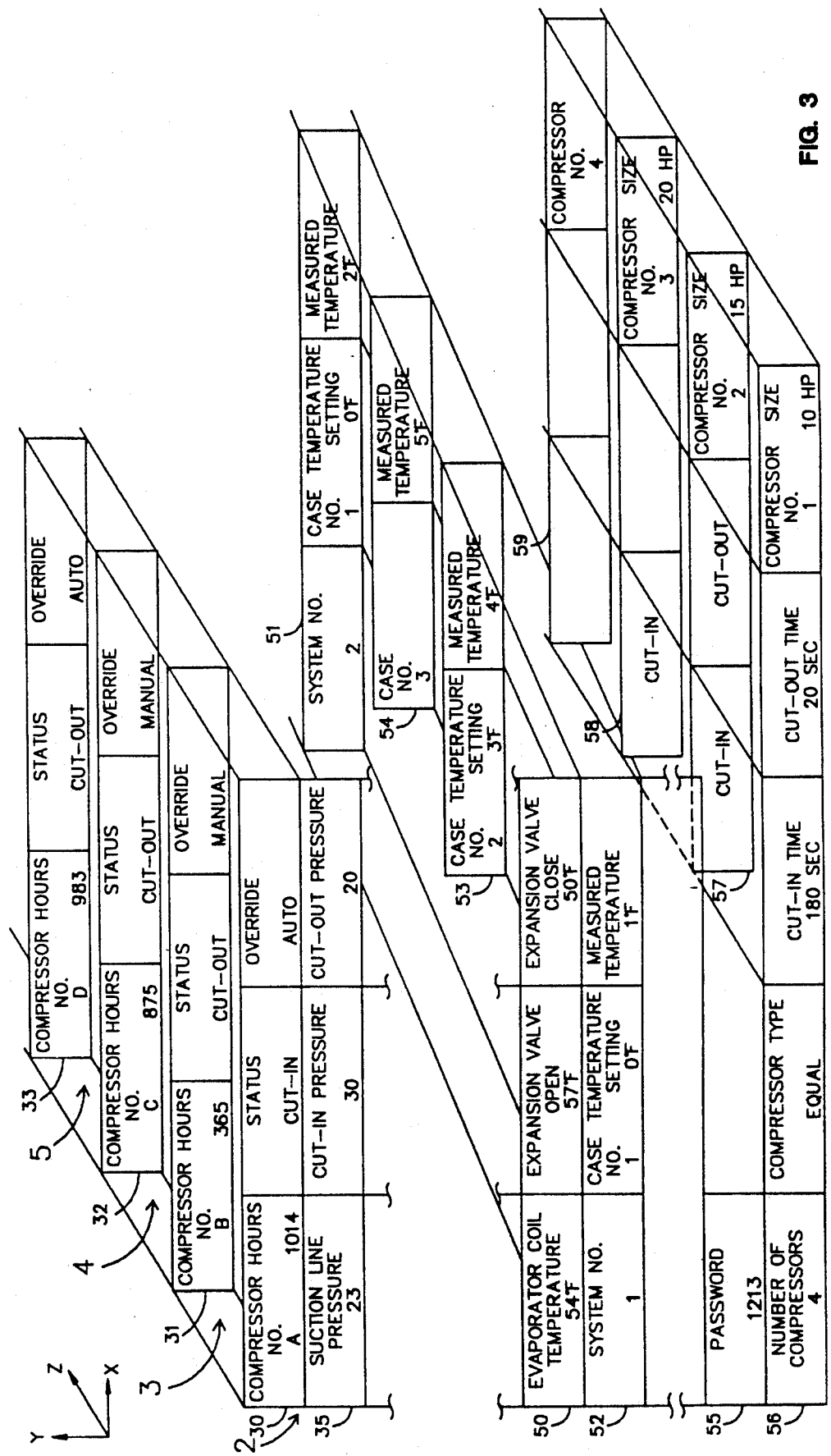
FIG. 3 shows, in an isometric perspective drawing, the storage arrangement of typical operating parameters of the refrigeration system of FIG. 1 arranged in a plurality of data arrays and grouped according to operation function.

Turning now to FIG. 3, the storage of the operating parameters for the refrigeration system of FIG. 1 in accordance with the present invention is illustrated. The parameters are stored in data cells which are conceptually shown in FIG. 3 arranged as a plurality of data arrays, each array representing a spreadsheet approach to the organization of information While FIG. 3 does not represent the only way that such information could be organized and stored in the memory of control unit 1, it is illustrative of one efficient way that permits rapid and easy access to the stored information with minimum operator input operations.

Generally, the operating parameters, both adjustable and fixed, for the refrigeration system are arranged in a single spreadsheet 2 as shown in FIG. 3. The stored parameters contained in the data cells for spreadsheet 2 are labeled in FIG. 3 by rows. That is, the top row of data cells for spreadsheet 2 is labeled 30 while the bottom row is labeled 56. The arrangement for FIG. 3 is for purposes of illustration only and is not intended to represent the only arrangement for these required stored information.

Row 30 of spreadsheet 2 contains three data cells, and conceptually can be thought of as having X, Y, Z coordinates in a three dimensional cubic arrangement. Thus, the three cells comprising row 30 may have $(X_1, Y_1, Z_1)$, $(X_2, Y_1, Z_1)$ and $(X_3, Y_1, Z_1)$ vector identifiers associated therewith for the computer to keep track of where such cell is physically located in the computer's memory.

The parameters stored in any given row or cell of the spreadsheet 2 may represent data for one element or component of the refrigeration system where there are several identical or related components. It is efficient therefore to provide depth of storage of the related parameters for the related or identical components in separate spreadsheets conceptually shown in FIG. 3 locatable in accordance with the third dimension Z. Thus, row 30, which contains compressor information for one of the plurality of compressors A–D of FIG. 1 (compressor A), is mappable into a plurality of different spreadsheets 3, 4 and 5 in accordance with different values of Z. The corresponding rows in these spreadsheets or data arrays 3, 4 and 5 are labeled in FIG. 3 as rows 31 (for compressor B, spreadsheet 3), 32 (for compressor C, spreadsheet 4) and 33 (for compressor D, spreadsheet 5). Row 32, therefore, would have its three data cells identified by the coordinate vectors $(X_1, Y_1, Z_3)$, $(X_2, Y_1, Z_3)$ and $(X_3, Y_1, Z_3)$.

Figure 5:
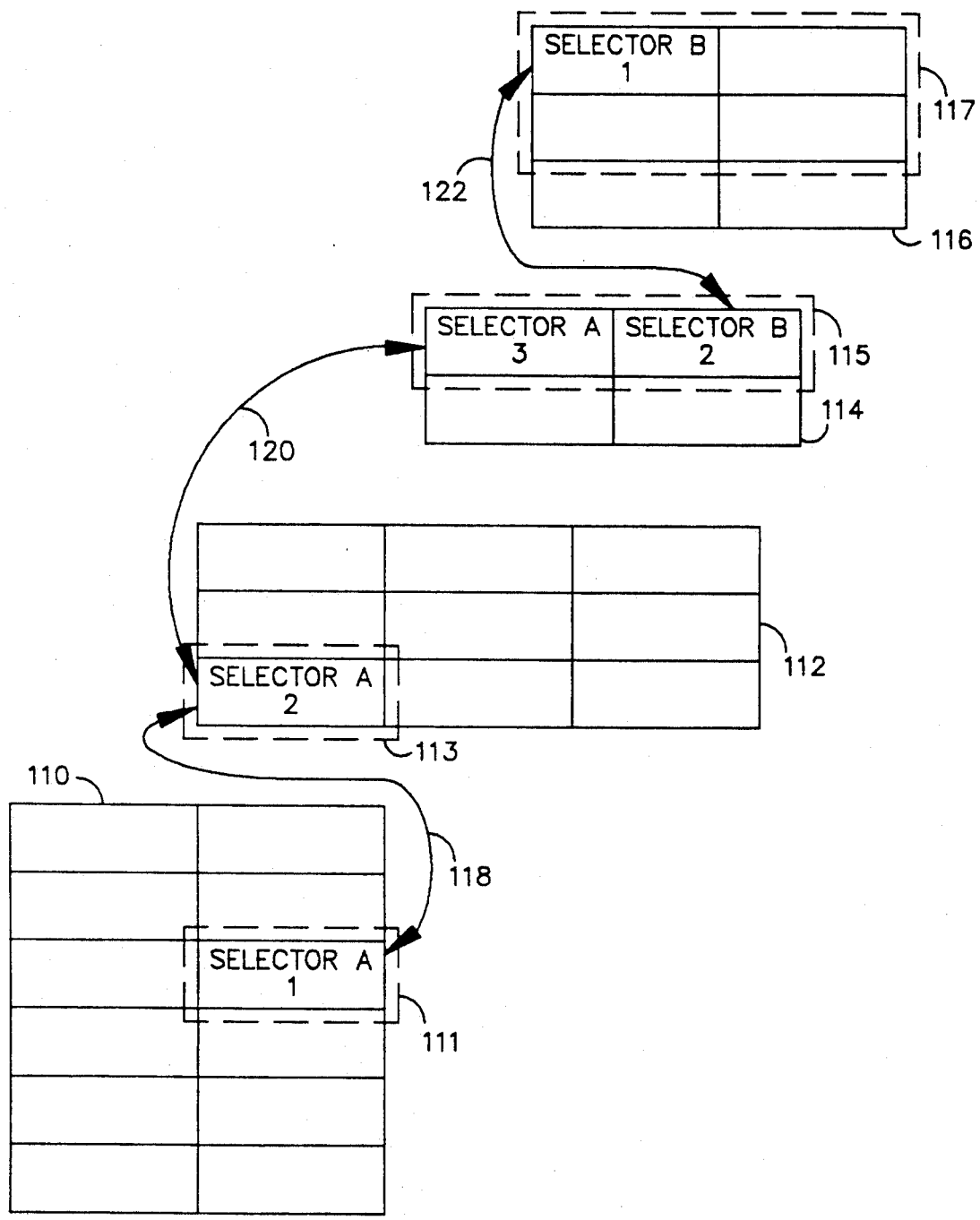
FIG. 5 illustrates one possible mapping between a plurality of data arrays such as those shown in FIG. 3.

As described below, the operator input required to accomplish the location and display of the information contained in rows 30–33, and for that matter any data cell in any spreadsheet, is quite minimal. FIG. 3 illustrates other examples of multiple spreadsheets for the storage of related information for similar components in the system. While FIG. 3 illustrates additional spreadsheets having only a single row, it is quite possible to have such further spreadsheets have multiple rows as well, where the mapping of one spreadsheet to another occurs at a given row or cell, and once into the other spreadsheet, movement around that spreadsheet could be independent of into which cell the mapping took place. FIG. 5 illustrates this feature of the present invention.

To further facilitate the ease and efficiency of locating for display and adjustment the contents of a given data cell, the storage of system operating parameters has been grouped into sections of related information. For example, information for pressure control has been stored in spreadsheet 2 at rows 30 and 35; information for temperature control has been stored in rows 50 and 52. Although not shown in FIG. 3, further logical divisions of the system parameters, such as defrost control and alarms, may be contained in the spreadsheet 2. As is discussed with respect to FIG. 4, the control unit 1 contains a plurality of switches 85, 87, 91 and 93 which, when actuated, caused a mapping to occur to the section of spreadsheet 2 which contains the information generically related to which of the switches was actuated. Thus, if switch 85 is actuated when the system was displaying the contents of row 54, first cell (Case No. 3 Temperature Setting) the next data cell to be displayed would be from row 30 (Operating Time for Compressor A). In this manner, it is not necessary for the operator to step sequentially through each data cell, which is the normal progression, but may jump over cells by actuation of the appropriate section selection switches 85, 87, 91 or 93.

Row 55 illustrates a special data cell that contains a "password" which must be inputted by the operator to gain access to the lower rows of stored system parameters. This security feature could be implemented at any position in any of the data cells if it is desirable that not all operators be given access to certain data cells. In the example shown in FIG. 3, configuration information for the system of FIG. 1 is stored along with certain operating parameters, such as the cycle times for cut-in and cut-out.

Summarizing, parameters of the refrigeration system may be arranged conceptually in spreadsheets such as those shown in FIG. 3 by creating data arrays of cells within the random access portion 64 of the computer memory 62 as shown in FIG. 2. The cells in each data array are linked together to allow a moving window display to be moved over the virtual spreadsheet created and display the contents of each of the cells. In most cases, the moving window display will display only the contents of a single cell. However, several cells may be displayed if required for convenient operation.

Thus, the use of a moving window display in combination with directional keys permits an operator to scan over operating parameters of the refrigeration system as though these parameters were displayed on one or more spreadsheets. Additionally, as will be shown, the operator is able to conveniently and rapidly vector the moving window display from one spreadsheet to the next and from one section of the data to another.

Figure 4:
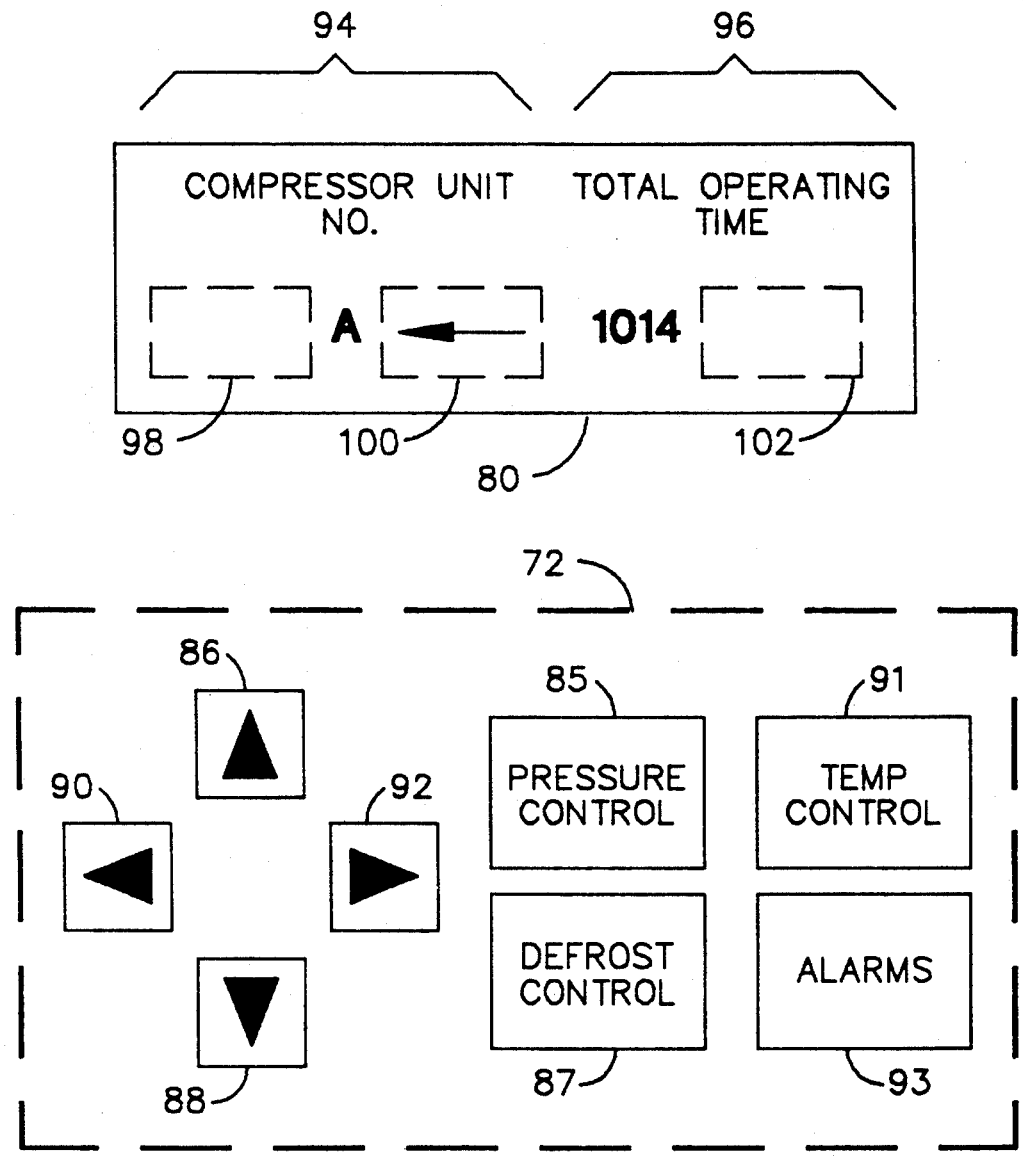
FIG. 4 shows a control and display panel for displaying and adjusting parameters contained in cells of data arrays, such as those shown in FIG. 3.

With reference now to FIG. 4, a control panel 81 is shown containing the alphanumeric display panel 80 and the keypad 72. The keypad 72 comprises four directional keys 86, 88, 90, and 92. The display panel 80 is shown displaying the first cell from row 30 of the spreadsheet 2 shown in FIG. 3. Within the display panel 80, a label 94 indicates that the quantity "A" displayed is a "COMPRESSOR UNIT NUMBER". The label 96 indicates that the quantity "1014" is the "TOTAL OPERATING TIME" for the compressor unit A shown in FIG. 1.

Also displayed within the display panel 80 in FIG. 4 is a cursor shown in cursor position 100. The cursor may be moved to the left to be displayed in cursor position 98 by depressing the key 90. The cursor may be moved to the right into the cursor position 102 by depressing the key 92. The cursor is moved within the cell displayed by the display panel 80 to permit adjustments of parameters and selectors contained therein.

Positioning the cursor in the position 100 will permit the unit number to be adjusted with the directional keys 86 and 88, key 86 causing an increase in unit number, and key 88, a decrease. The unit number in the displayed cell is a selector, in that adjustment thereof will permit vectoring the field of the display from the spreadsheet 2, row 30, to the spreadsheet 3, row 31. Depressing the key 86 will cause the displayed unit number to be changed from "A" to "B". After key 86 is depressed, the cell ($X_1$, $Y_1$, $Z_2$) of the spreadsheet 3 will be displayed. Vectoring of the field of the display from one spreadsheet to the other may be accomplished only by adjusting the value of a selector. Within the spreadsheets 2, 3, 4, and 5, only the unit number displayed in the first cell of each row 30, 31, 32, and 33 are selectors. In practice, data arrays may be so arranged as to have selectors in any position desired.

Thus, as the operator vectors the field of the moving window display with the keys 86, 88, 90 and 92, there is an effect of moving horizontally and vertically over the surface of a spreadsheet, as well as moving in a third dimension from one spreadsheet to another. In actuality, the digital computer 60 is responding to control panel entries by the operator and calling up parameter values in cells of data arrays stored in the random access portion 64 of the memory 62 for a display on the alphanumeric display panel 80.

Referring still to FIG. 4, the field of the display may be vectored to the right in the spreadsheet 2 (FIG. 3) by first moving the cursor to the position 102 by depressing the key 92. Depressing the key 92 when the cursor is in the position 102 will move the field of the display so that the cell ($X_2$, $Y_1$, $Z_1$) of row 30 is displayed. This cell contains a measurable parameter indicating that the compressor unit A is cut-in and operating. Depressing the key 92 once again will cause the field of the display to move to cell ($X_3$, $Y_1$, $Z_1$) of the spreadsheet 2. This cell indicates the condition of a manual override on the compressor unit A, and as shown in FIG. 3, indicates that compressor A is cycling automatically. By contrast, cell ($X_3$, $Y_1$, $Z_3$) in the spreadsheet 4 of FIG. 3 indicates that the compressor unit C has been manually overridden. The manual override parameter is an adjustable parameter which can be changed by use of the keys 86 and 88 to toggle the condition between "manual" and "auto" operation. To perform this operation, the cursor must be positioned to the right of the parameter appearing in the display 80, i.e., position 102.

With reference to FIGS. 3 and 4, the field of the display may be moved from the cell ($X_1$, $Y_1$, $Z_1$) of row 30 to display the cell ($X_1$, $Y_2$, $Z_1$) of row 35 on the spreadsheet 2 by first moving the cursor to the position 98 by depressing the key 90. When the cursor has moved to the position 98, the field of the display may be moved downward by depressing the key 88. The cell ($X_1$, $Y_2$, $Z_1$) of row 35 containing "SUCTION LINE PRESSURE" as sensed by the pressure sensor 38 (FIG. 1) will then be displayed.

With the field of the display remaining on the spreadsheet 2, depressing the key 88 (FIG. 4) will vector the field of the display downward from the cell $(X_1, Y_2, Z_1)$ of row 35 to lower rows, such as row 55. Row 55 contains a password which is adjustable upward by depressing the key 86 and downward by depressing the key 88. The operator must adjust the password to a pre-programmed value before the field of the display may be moved downward to row 56. The first cell in row 56 displays configuration information indicating that the compressor unit A (the compressor 20 in FIG. 1) is installed in the system.

Typically, changes to the displayed parameter in response to actuation of keys 86 and 88 occur at a slow rate so that the operator may correctly change the value without overshooting his intended value. However, where large changes in the displayed value are needed, holding either switch depressed for a continuous short period of time will cause the rate of change to increase thereby providing a more efficient and rapid convergence to the desired value.

Also shown on the control panel in FIG. 4 are four regional move keys 85, 87, 91 and 93. These keys permit immediate movement of the field of the moving window display to specific cell locations without the cell-by-cell movement effected by the use of the move keys 86, 88, 90 and 92. For example, the "PRESSURE CONTROL" regional move key 85, when depressed, will move the field of the display to the first cell in row 30 of spreadsheet 2 to show the run time for compressor A. This instantaneous move will occur irrespective of the current cell or cells being displayed by the display panel 80. The regional move key 91 will cause movement of the field of display to the first cell of row 50 to show the evaporator coil temperature. Similarly, regional move keys 87 and 93 move the field of the display to the appropriate cells for the functions selected.

Selection of the number of regional move keys and the particular regions to which they move the field of the display is determined by the programming of the computer 60, and a virtually unlimited number of combinations are possible. Factors, such as the size and capacity of the refrigeration system to be controlled, the tightness of limits on the control of parameters within the refrigeration system, as well as other factors dictated by the particular applications, will determine the size and arrangements of the various spreadsheets and the location of the various sections. The specific functions of the regional move keys 85, 87, 91 and 93 are, therefore, selected to be illustrative only.

A block of memory locations within the random access portion 64 of the memory 62 (FIG. 2) is reserved for each of the cells. Each block contains one or more parameters and/or selectors which are to be displayed as well as any required display labels. Additionally, each block contains linking information indicating the way that the cell associated with the block of memory locations is linked together to form a data array. Linking information is also contained within those blocks associated with cells containing selectors to indicate one or more cells within other data arrays to which the cell is linked by selector adjustment.

The linking information contained within each block therefore defines a permissible path through which the field of the display may pass within the data array to which the cell associated with the block is a part. Additionally, linking information contained in blocks associated with cells having selectors defines a permissible path for the field of the display between various data arrays. Virtually unlimited flexibility to define a plurality of permissible paths through the various data arrays is available by selection of the linking information within the various blocks.

Turning now to FIG. 5, four data arrays 110, 112, 114, and 116, each of different dimensions, are shown being linked by permissible paths through which field of the display may be vectored by adjusting values of selectors. Within the data array 110, the value of a selector A is indicated as "1". Adjustment of the value of the selector A from 1 to 2 will cause the field of the display (indicated by the dotted line 111) to be moved along a permissible path segment 118 to a cell within the data array 112. The field of the moving window display, now indicated by the dotted line 113, will display the value of the selector A as 2. Adjustment of the value of the selector A from 2 to 3 will cause the field of the display to be moved along a permissible path segment 120 to a cell in the data array 114.

Within the data array 114, the field of the display encompasses two cells. The field of the display within the array 114 is shown by the dotted line 115. Movement of the cursor will allow selection of either selector A or selector B to be changed. Adjustment of the selector B will allow the field of the display to be moved along a permissible path to the array 116. Within the array 116, the field of the display indicated by the dotted line 117 encompasses four cells.

The number of selectors and/or parameters which may be displayed is limited only by the size of the alphanumeric display panel 80 in FIG. 4. A virtually unlimited number of data arrays of assorted sizes having cells displaying a variety of different selectors and parameters may be defined by appropriately programming the computer 60 in FIG. 2. The number of cells which may be included within the field of the moving window display is similarly selectable by appropriate programming of the computer 60.

Figure 6:
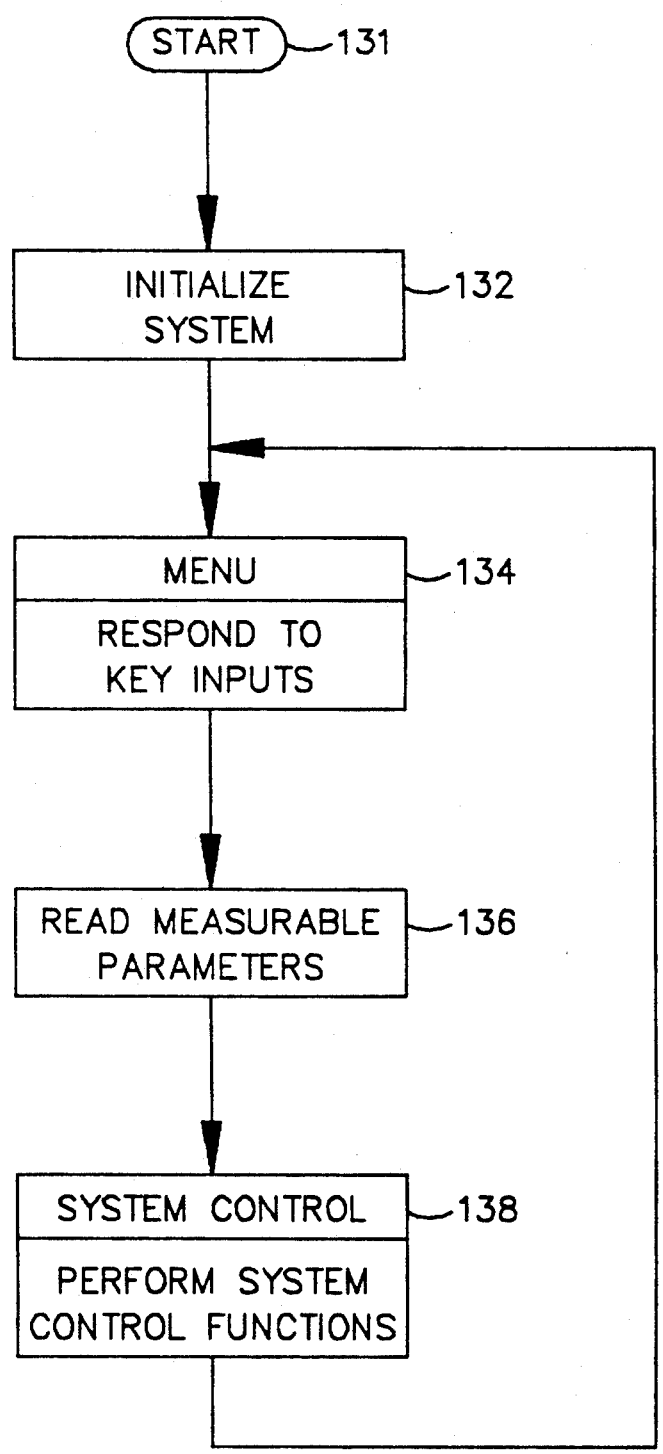
FIG. 6 is a simplified flow diagram of a program run by the stored program processor employed in the embodiment of FIG. 2.

Referring now to FIG. 6, a simplified functional flowchart is shown for the program run by the computer 60 (FIG. 2). A main program 130 begins at a start location 131 and proceeds through a routine at 132 for initializing the system of FIG. 1 during power up. Control is then passed to a menu program 134 which is more fully shown in FIG. 7. Once the menu routine has been performed, control of the program passes to a routine 136 which causes measurable parameters to be read from the refrigeration system controlled by the system of FIG. 2 which embodies the present invention. Control is then transferred to a system controlling routine 138 in which the computer 60 performs functions required to control the operation of the refrigeration system, as will later be described. After the system control functions are performed in the routine 138, the program loops back to re-enter the Menu routine 134.

Figure 7:
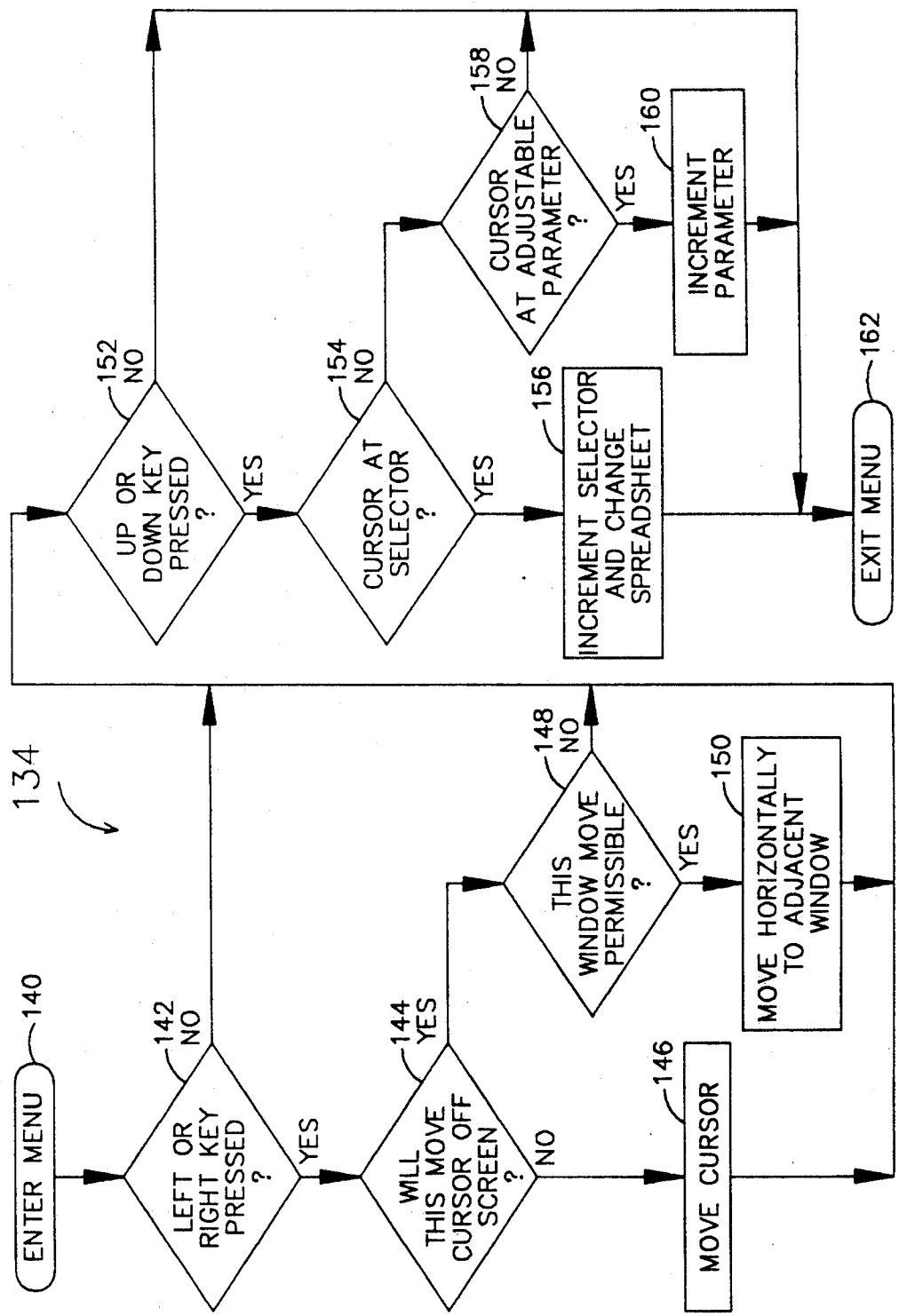
FIG. 7 shows a more detailed flow diagram of the Menu routine shown in the flow diagram of FIG. 6.

Referring now to FIG. 7, the Menu program 134 begins at an entry point 140. A decision block 142 determines whether the move left key (the key 90 in FIG. 4) or the move right key (the key 92 in FIG. 4) has been depressed. If neither key has been depressed, control is transferred to a decision block at 152. If either key has been depressed, control transfers to the decision block 144.

At the decision block 144, the program looks to see whether this move would move the cursor off the screen. Referring again to FIG. 4, this would be the case if the cursor is in the position 98 with the key 90 pressed, or if the cursor is in the position 102 with the key 92 pressed. This is an indication that the operator desires to move the field of the display to an adjacent cell within the data array. At a decision block 148, the linking information within the cell currently displayed is examined to determine whether this is an attempt to move along a permissible path. If not, the command is ignored. If this lateral move to an adjacent cell is permissible, a routine 150 will cause the field of the display to move responsive to the depression of the key.

If the requested cursor move responsive to depression of the key 90 or the key 92 is not an attempt to move the cursor off the screen, the cursor will be moved within the screen to a laterally adjacent cursor position by a routine 146.

The decision block 152 determines whether the up key (the key 86 in FIG. 4) or the down key (the key 88 in FIG. 4) has been depressed. If neither has been depressed, control is transferred from the decision block 152 to a decision block 162. Otherwise, control is transferred to a decision block 154 to determine whether the cursor position is located at a selector.

If the cursor is located at a selector, a routine 156 will increment or decrement the selector and follow the permissible path so defined to an adjacent data array to display the appropriate cell therein. Otherwise, control is transferred to a decision block 158 to determine whether the cursor is located at the site of an adjustable parameter. If so, the parameter is incremented up or down as appropriate.

A decision block 163 looks for depression of a regional move key. If none are depressed, the menu program is exited at 162. Otherwise, the field of the display is moved to the appropriate cell or cells by a routine 164.

Referring now to FIG. 8, a more detailed flowchart of the system control routine 138 shows an entry point at 180. The suction line pressure (measured by the pressure sensor 38 shown in FIG. 1) is read by the routine 182. The suction line pressure is compared to a cut-in pressure (displayed in the second cell of row 35 in the spreadsheet 2 shown in FIG. 3) in a decision block 184. If the suction line pressure is not greater than the cut-in pressure, then the suction line pressure is compared to the cut-out pressure (displayed in the third cell of row 35 in a decision block 186. If the suction line pressure is not less than the cut-out pressure, the system control routine 138 is exited at 208.

If the measured suction line pressure is greater than the cut-in pressure, additional compressor capacity is required by the refrigeration system. A cut-in delay software timer monitored by the computer 60 is checked in a decision block 188 to determine whether sufficient time has elapsed since the last time a compressor unit has been cut in. If so, the compressor unit which has been cut off the longest is switched on by energizing the appropriate relay solenoid, and the cut-in delay software timer is reset.

If the measured suction line pressure is less than a cut-out pressure, the refrigeration system has too much compressor capacity. A cut-out delay software timer monitored by the computer 60 is checked in a decision block 202 to determine whether sufficient time has elapsed since the last compressor unit was switched off. If so, the compressor unit which has been running the longest is switched off and the cut-out delay software timer is reset.

While a particular embodiment of the present invention has been shown and described, it will be understood that the invention is not limited thereto, since many modifications may be made and will become apparent to those skilled in the art. For example, a control system according to the present invention can easily be adapted for use with a residential or commercial heating and air conditioning system. The present invention as disclosed herein is limited only by the following claims.

What is claimed is:

1. An apparatus for controlling a refrigeration system and for displaying and adjusting, responsive to an operator's input, operating parameters of said system, comprising:

(a) a memory for storing values of said parameters in a plurality of data arrays, each data array comprising a plurality of cells arranged in two dimensions for storing said values;

(b) a moving window display for displaying the contents of a cell of said memory; and (c) directional control means responsive to said operator input for selecting the cell to be displayed by said moving window display, and for adjusting the parameter values stored in said displayed cell, each of said arrays containing a cell adapted to store an array selector indicative of the array containing the currently displayed cell, said directional control means adapted for adjusting the array selector within the displayed cell for moving said moving window display to an adjacent cell in one of said other arrays.

2. The apparatus according to claim 1, wherein said desired operating parameter is temperature.

3. The apparatus according to claim 1, wherein said desired operating parameter is humidity.

4. The apparatus according to claim 1, further comprising processor means for inputting measurable parameter values measured within said system into said memory storage means and for outputting adjustable parameter values from said memory storage means to said system.

5. The apparatus according to claim 4, wherein said processor means comprise a stored program computer.

6. The apparatus according to claim 4, further comprising analog/digital conversion means for converting measurable parameter values to digital form for storage within said memory storage means.

7. The apparatus according to claim 1, wherein said control means comprises a key pad having:

(a) a first pair of directional keys for selecting for adjustment parameters and selectors within a displayed cell, and for causing a horizontally adjacent cell in said selected array to be displayed by said moving window display means; and (b) a second pair of directional keys for adjusting system selectors and operating parameters within a displayed cell and for causing a vertically adjacent cell in said selected array to be displayed by said moving window display means.

8. The apparatus according to claim 7, further comprising a plurality of regional move keys, each said regional move key programmed for vectoring said data array to display a selected cell independent of the cell currently being displayed.

9. The apparatus according to claim 1, wherein said moving window display means comprises an alphanumeric display panel for displaying said selector and parameter values.

10. The apparatus according to claim 9, wherein said alphanumeric display panel is a liquid crystal display.

11. The apparatus according to claim 9, wherein said alphanumeric display is adapted to display a cursor indicating the parameter or selector to be adjusted by said control means.

12. An apparatus for controlling a refrigeration system and displaying and adjusting a plurality of operating parameters of the refrigeration system, responsive to an operator's input, comprising:
   (a) a memory for storing the values of the parameters of the refrigeration system, said memory comprising a plurality of arrays, each array in said plurality of data arrays containing a plurality of cells arranged in two dimensions, each said array containing at least one array selector and one parameter;
   (b) an alpha-numeric display panel for displaying the parameters stored in a selected cell;
   (c) a keypad comprising
      (i) a first set of directional keys for selecting one of said plurality of parameters stored in said selected cell displayed on said alpha-numeric display panel for adjustment and for selecting a horizontally displaced adjacent cell to be displayed by said alpha-numeric display panel,
      (ii) a second set of directional keys for adjusting said selected parameter displayed by said alpha-numeric display panel and for selecting a vertically displaced adjacent cell for display by said alpha-numeric display panel, and
      (iii) a plurality of regional move keys, each regional move key capable of selecting a preselected cell for display independent of the cell currently being displayed;
   (d) an input/output unit for receiving values of measured parameters from said refrigeration system and for transmitting control signals to said refrigeration system; and
   (e) a digital computer for receiving operator inputs from said keypad, communicating with and controlling said refrigeration system through said input/output unit, and controlling said alpha-numeric display panel to display the contents of said selected cell.

13. The apparatus according to claim 12, wherein said input/output unit comprises:
   (a) an analog to digital converter for converting measured values of parameters in analog form into digital form for storage in said memory;
   (b) A serial databus interface for transmitting a value of setpoint temperature to said system; and
   (c) a plurality of discrete outputs for controlling a plurality of switches within said system for switching components of said system off and on.

14. An apparatus, as set forth in claim 12, wherein each of said plurality of regional move keys includes a label indicative of the cell selected by operation of said regional move key.

15. An apparatus, as set forth in claim 12, wherein each of said first set of directional keys includes a label having a first arrow thereon pointing in generally opposite directions and each of said second set of directional keys includes a label having a second arrow thereon pointing in generally opposite directions, said first and second arrows being generally orthogonal one to the other.

16. An apparatus for controlling a refrigeration system and displaying and adjusting operating parameters within said system in response to an operator's input, comprising:
   (a) a computer memory for storing a data array comprising a plurality of cells for storing a plurality of parameter values wherein said parameter values comprise at least one array selector and at least one operating parameter, each of said cells having an address locating said cell within a three axis coordinate system;
   (b) an alpha-numeric display panel adapted for selectively displaying the parameter values of a selected cell;
   (c) means for selecting a parameter value within said selected cell, and for selecting a cell adjacent said selected cell along said first axis; and
   (d) second means for adjusting said selected parameter value, selecting a cell adjacent said selected cell along said second axis, and selecting a cell adjacent said selected cell along said third axis by adjusting said array selector.

17. An apparatus, as set forth in claim 16, wherein said second means includes a pair or directional keys adapted for selecting said adjacent cell along said third axis in response to adjusting the value of said array selector.

18. An apparatus, as set forth in claim 17, wherein said directional keys are adapted for selecting said adjacent cell along said second axis in response to selecting a preselected location within the selected cell.

19. An apparatus, as set forth in claim 18, wherein the first means includes a pair of directional keys adapted for selecting the adjacent cell along said first axis in response to selecting a preselected location within the selected cell.

20. An apparatus for controlling a refrigeration system and for displaying and adjusting the refrigeration system parameters, comprising:
   (a) a memory for storing the refrigeration system parameters in a plurality of arrays, each said array having a plurality of cells arranged in two dimensions for storing the refrigeration system parameters, the vector between adjacent arrays defining a third dimension;
   (b) a moving window display for displaying the contents of a cell; and
   (c) a control means for selecting the cell to be displayed by said moving window display, for adjusting the contents of the displayed cell, and for vectoring in the third dimension irrespective of the currently displayed cell for selecting and displaying contents of any cell in said plurality of arrays.

* * * * *